T. F. HART.
SNIPPING MACHINE.
APPLICATION FILED MAR. 12, 1912.
1,040,671.
Patented Oct. 8, 1912.
2 SHEETS—SHEET 1.
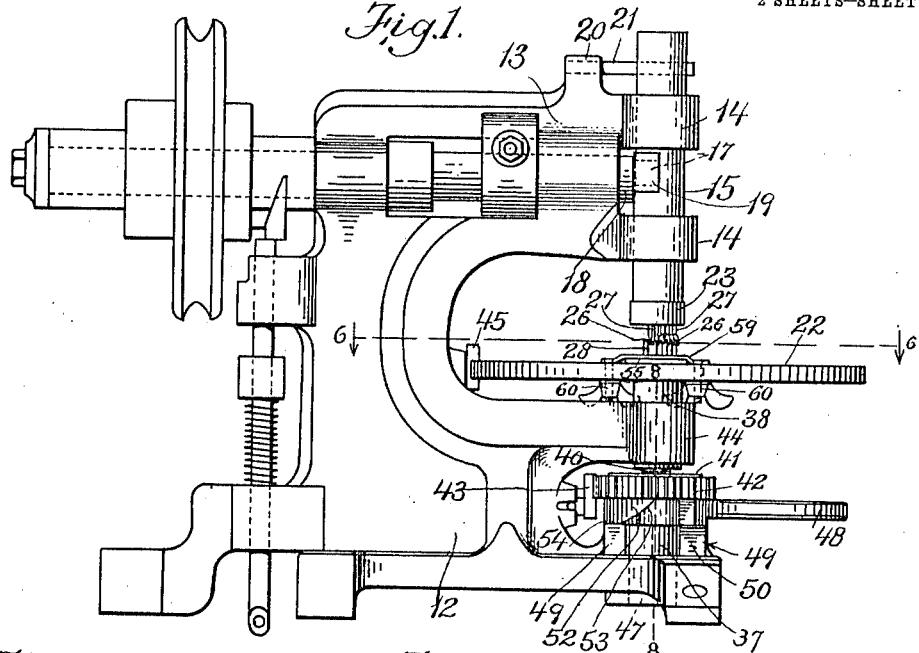
Witnesses:
Inventor:
Thomas F. Hart

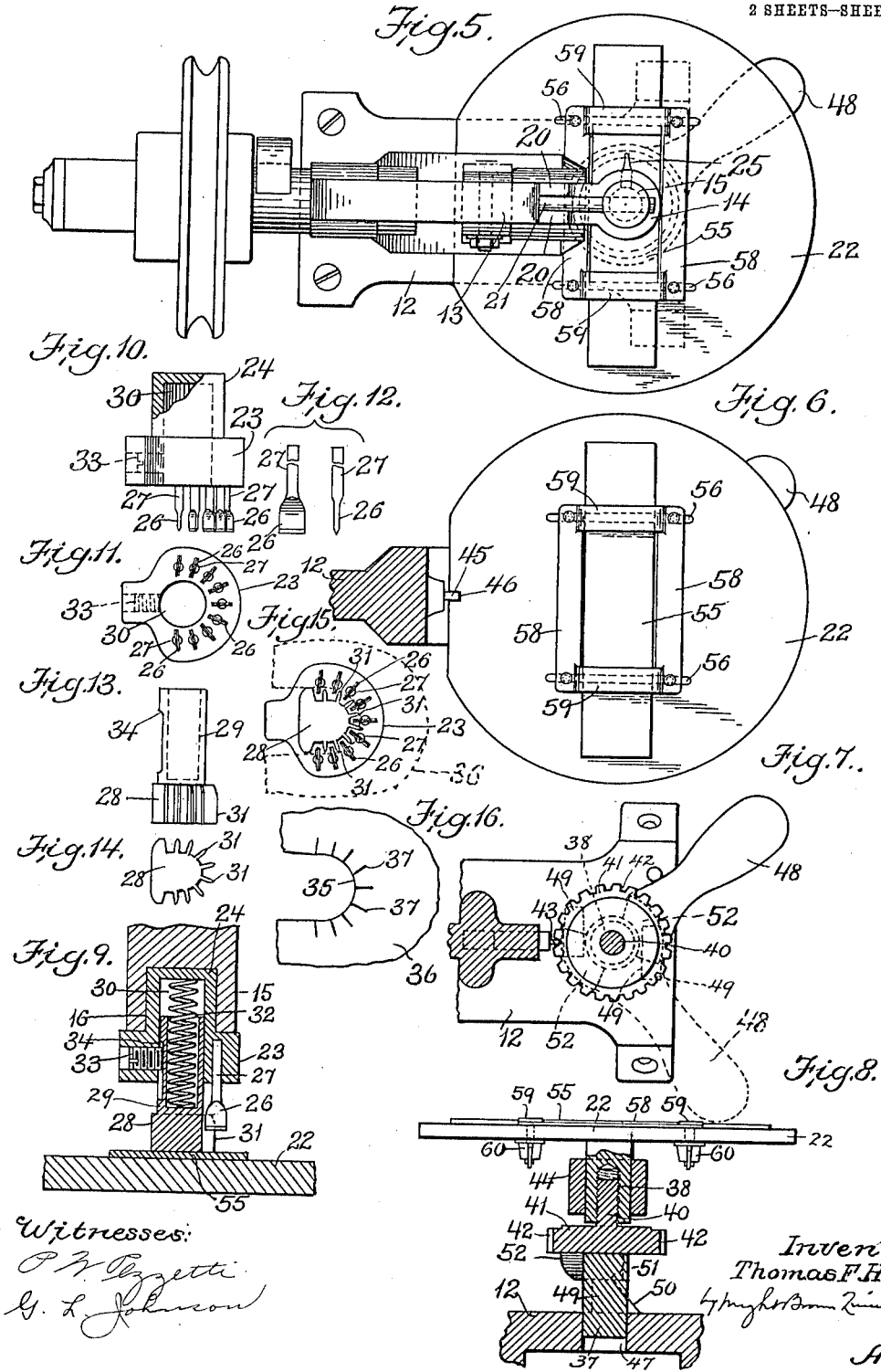

UNITED STATES PATENT OFFICE.

THOMAS F. HART, OF LYNN, MASSACHUSETTS.

SNIPPING-MACHINE.

1,040,671.  Specification of Letters Patent.  Patented Oct. 8, 1912.

Application filed March 12, 1912. Serial No. 683,397.

*To all whom it may concern:*

Be it known that I, THOMAS F. HART, a citizen of the United States, and a resident of Lynn, in the county of Essex and State of Massachusetts, have invented certain new and useful Improvements in Snipping-Machines, of which the following is a specification.

This invention relates to machines for cutting short diverging slits in the inwardly curved edge of a piece of material such as a leather shoe vamp, the object of the slits being to enable the curved edge to be neatly and smoothly folded under the body portion.

A snipping machine of this character comprises a cutting bed on which the work is supported, and a cutter head movable toward and from the bed and provided with diverging knives which slit or snip the edge of the work, a gage being provided to position the work relatively to the knives, so that the latter will correctly form the slits in the work.

My invention has for its object first, to provide an improved construction of the cutter head which carries the slitting knives, the cutter head carrying with it the work gage so that the cutter head and gage are applicable to and removable from the machine as one part, provision being thus made for interchangeably using cutter heads and gages of different sizes and shapes, according to the shape of the work to be cut or snipped.

The invention also has for its object to enable the bed to be readily lowered from its operative position to facilitate the application and removal of the cutter head and gage and quickly restored to its raised operative position, and also to enable the height of the bed when in its raised position to be adjusted in accordance with the thickness of the work and other conditions.

The invention also has for its object to provide certain improvements in the cutting bed whereby the face of the bed which coöperates directly with the knives may be conveniently adjusted to present fresh portions to the knives, as occasion may require.

The invention consists in the improvements which I will now proceed to describe and claim.

Of the accompanying drawings:—Figure 1 represents a side elevation of a snipping machine embodying my invention. Fig. 2 represents an end elevation of the same. Fig. 3 represents a side elevation of parts of the machine, other parts being shown in vertical section. Fig. 4 represents a section on line 4—4 of Fig. 2. Fig. 5 represents a top plan view of the machine, the cutter head and gage being omitted. Fig. 6 represents a section on line 6—6 of Fig. 1, and a plan view of the parts below said line. Fig. 7 represents a section on line 7—7 of Fig. 3. Fig. 8 represents a section on line 8—8 of Fig. 1. Fig. 9 represents a section on line 9—9 of Fig. 2. Fig. 10 represents a side elevation of the cutter head and its knives, a part of the shank of the cutter head being shown in section. Fig. 11 represents a bottom plan view of the cutter head. Fig. 12 represents in separate views one of the chisel shaped knives of the cutter head. Fig. 13 represents a side view of the gage separated from the cutter head. Fig. 14 represents a bottom plan view of the gage. Fig. 15 represents a bottom plan view showing the cutter head and gage assembled. Fig. 16 represents a side view of a portion of a vamp having a curved edge portion in which are slits formed by the knives arranged as shown by Figs. 11 and 15.

The same reference characters indicate the same parts in all the figures.

In the drawings:—12 represents the base portion of the frame of the machine, said frame having an overhanging arm 13 on which are guides 14 for a vertically reciprocating carrier 15, said carrier being preferably a cylindrical body having in its lower end a socket 16 (Fig. 9) which receives the shank of the cutter head hereinafter described. The carrier is reciprocated by an eccentric wrist pin 17 (Fig. 3) on a driving shaft 18 which is journaled in bearings on the arm 13, said wrist pin entering a socket in a block 19 fitted to slide transversely in a recess formed for its reception in the carrier. Rotation of the carrier in its bearings is prevented by fixed guides 20 on the arm 13, and a stud 21 on the carrier projecting between said guides.

22 represents the body or base portion of the cutting bed, said bed being movably supported by means hereinafter described below the carrier 15, and adapted to support the work to be snipped and to coöperate with the cutting knives in snipping the work.

23 represents a cutter head which is provided with a shank 24 adapted to enter and closely fit the socket 16 in the carrier and to be secured therein by means of a set screw 25 (Fig. 2). The cutter head is provided with a series of diverging knives 26, each of which is preferably chisel shaped, as shown by Fig. 12, and provided with a shank 27 firmly secured in an orifice formed for its reception in the cutter head 23.

The cutting edges of the knives 26 diverge from the central portion of the cutter head, as shown clearly by Figs. 11 and 15.

28 represents a gage provided with a shank 29 having a sliding fit in a socket 30 (Fig. 10) formed for its reception in the cutter head 23 and its shank 24. The gage is provided with diverging gage members 31 which are relatively thin ribs or wings radiating from the body portion of the gage and alternating with and projecting between the knives 26, as shown by Fig. 15. The gage 28 is normally projected below the cutting edges of the knives 26, as indicated by Fig. 9, which shows the relative position of the gage and cutter head when the work is supported by the bed 22 in position to be acted on by the cutters, the latter being shown in their raised position. The gage is caused to bear on the bed either by gravitation or by a spring 32 interposed between the inner end of the socket formed in the gage shank 29, said spring acting to press the gage against the bed 22. The downward movement of the gage is limited by a stop screw 33 inserted in the cutter head 23 and a shoulder 34 (Fig. 9) on the gage shank, said shoulder abutting against the screw 33 and preventing the withdrawal of the gage shank from the cutter head.

It will now be seen that when the bed 22 is supported in the position shown in the drawings and the carrier 15 is at the upper end of its stroke, as shown by the drawings, the knives are raised above the cutting bed, while the gage bears yieldingly on the bed. When the carrier 15 descends, the gage remains stationary and the cutter and its knives move downwardly.

The gage members 31 collectively form a bearing in the inwardly curved edge 35 (Fig. 16) on the piece of work 36, so that the outer portions of the knives form slits 37 of uniform length in the curved edge. The cutter head and gage are adapted to be applied to and removed from the carrier 15 as a single part, the cutter head being secured in place by setting up the screw 25, and released by loosening said screw.

The means hereinafter described for quickly depressing the bed 22 below its operative position enable the bed to be lowered sufficiently to permit the convenient removal of the cutter head and gage and the substitution therefor of a cutter head and gage adapted for a different size and shape of the curved edge 35. When the cutter head is removed, the stop screw 33 and shoulder 34 prevent the separation of the gage from the cutter head. The bed 22 is provided with a downwardly projecting telescopic shank which bears on a vertically movable strut 37, adapted to be supported at different heights on the base of the frame. The telescopic shank includes an upper member 38 having an internal screw-threaded socket 39 and a lower member 40 which is externally threaded to engage the thread of the socket 39, the member 40 bearing on the upper end of the strut 37. A rotary movement of the member 40 in one direction or the other will diminish or increase the length of the telescopic shank as the case may be. The object of this adjustment of the length of the cutting bed shank is to adjust the operative height of the cutting bed and provide for variations in the thickness of the work. The member 40 is provided with a circular head 41, the periphery of which has vertical notches 42, either of which is adapted to be engaged by a spring-pressed latch or detent 43 to lock the member 40 at any desired adjustment, and thus maintain any determined length of the cutting bed shank.

The shank member 39 is movable vertically in a fixed guide 44 on the frame, rotary movement of the bed being prevented by a fixed vertical rib or guide 45 which projects into a groove 46 (Fig. 6) in the bed 22.

The strut 37 is adapted both to turn and to move endwise in a guide 47 in the base of the frame, and is provided with a handle or lever 48 by which it may be turned. The frame is provided with two rests 49 at opposite sides of the guide 47, each rest having an inclined side face 50 and a horizontal upper face 51, (see Figs. 2 and 8). The strut is provided with two oppositely extending projections 52, each having an inclined side face 53 (Figs. 1 and 8), and a horizontal bottom face 54, (Figs. 1 and 3).

When the lever 48 occupies the dotted line position, shown by Fig. 7, its projections 52 are located between the fixed rests 49 and bear on portions of the frame base below said rests, the strut being thus supported in a depressed position and the cutting bed 22 being correspondingly depressed. When the lever 48 is turned to the position shown by full lines in Fig. 7, the projections 52 on the strut ride upwardly on the inclined faces 50 on the rests 49 until said projections rest on the upper faces 51 of said rests, as indicated by Figs. 1, 2, 3 and 8, the strut and the bed supported thereby being thus quickly raised and the bed supported in its operative position. The fixed rests 49 on the frame and the projections 52 on the strut constitute coöperating members whereby the strut is raised by partial rotation in one direction and depressed by a partial rotation in the opposite direction, the bed being quickly shiftable from each position to the other.

In practice, the bed is depressed by the means described only when it becomes necessary to change the cutter head and gage, the bed being at all other times supported in its raised operative position.

55 represents a face plate which bears movably on the bed 22 and constitutes the acting portion of the bed, said face plate being of copper or other metal or alloy adapted to coöperate with the knives without injury to their cutting edges. Means are provided for adjusting the face plate to present different portions of its surface to the knives. As here shown, the bed 22, which may be termed the base portion of the cutting bed, is provided with parallel slots 56 which receive screw-threaded studs 57 attached to a clamping frame which is adapted to confine the face plate 55 against the bed or base 22. Said frame is composed of parallel longitudinal members 58 and parallel transverse members 59. The members 58 bear on the longitudinal edges of the face plate 55, while the members 59 are offset upwardly and extend across and bear on the upper surface of the face plate. The studs 57 are provided with wing-clamping nuts 60 adapted to be set up against the under side of the bed base 22, as shown by Fig. 4. The slots 56 enable the clamping frame to be adjusted with the face plate in one direction relatively to the bed base, and the face plate is adjustable endwise independently of the clamping frame. Provision is therefore made for presenting a relatively large area of the face plate to the knives.

It is to be understood that, in use, the gage 28 bears upon the face plate 55 as shown in Fig. 9, and that the work 36 is laid on top of the plate 55 with its inwardly curved edge 35 (Fig. 16) bearing against the edges of the members 31 of the gage as shown in Fig. 15. That is, the inner edge of the work bears against the vertical side edges of the ribs or members 31, the work never extending underneath the gage.

I claim:—

1. In a snipping machine, in combination, a cutting-bed, a reciprocating carrier movable toward and from the bed, a cutter-head engaged with the carrier and having a series of diverging knives, and a gage movably engaged with the cutter-head and normally depressed yieldingly below the knives, whereby the gage is adapted to bear without movement on the bed while the cutter-head is moving.

2. In a snipping machine, in combination, a cutting bed, a reciprocating carrier movable toward and from the bed, a cutter-head having a shank engaged with the carrier and provided with a central socket and with a series of diverging knives, and a gage having a shank slidingly engaged with said socket, the gage being normally depressed yieldingly below the knives, whereby it is adapted to bear on the bed while the cutter-head is moving.

3. In a snipping machine, in combination, a cutting bed, a reciprocating carrier movable toward and from the bed, a cutter-head having a shank engaged with the carrier and provided with a central socket and with a series of diverging knives, a gage having a shank slidingly engaged with said socket, and a spring whereby the gage is normally depressed below the knives and held in contact with the bed while the cutter-head moves.

4. In a snipping machine, in combination, a cutting bed, a reciprocating carrier movable toward and from the bed, and having a shank-receiving socket and shank-securing means, a cutter head having a shank detachably secured in said socket and a series of diverging knives, and a gage movably engaged with the cutter head and adapted to bear without movement on the bed while the cutter is moving, the cutter head and gage being loosely connected and applicable to and removable from the carrier as a single part.

5. In a snipping machine, in combination, a reciprocating carrier, a cutter head detachably secured to the carrier and provided with a series of diverging knives, a gage movably engaged with the cutter head and normally depressed yieldingly below the knives, a cutting bed movable toward and from the carrier, and bed-supporting mechanism having means for shifting the bed from a raised operative position to a depressed inoperative position, the cutter head and gage being removable from the carrier when the bed is depressed.

6. In a snipping machine, in combination, a reciprocating carrier, a cutter head engaged therewith and provided with a series of diverging knives, a gage movably engaged with the cutter head and normally depressed yieldingly below the knives, a cutting bed movable toward and from the carrier, and bed-supporting mechanism having means for adjusting the operative height of the bed, the gage being adapted to bear without movement on the bed while the cutter-head is moving, and to conform automatically to the height of the bed.

7. In a snipping machine, in combination, a reciprocating carrier, a cutter head engaged therewith and provided with a series of diverging knives, a gage movably engaged with the cutter head and normally depressed yieldingly below the knives, a cutting bed movable toward and from the carrier, and bed-supporting mechanism having means for shifting the bed from a raised operative position to a depressed inoperative position, and means for adjusting the operative height of the bed.

8. A snipping machine comprising a supporting frame, a reciprocating carrier having cutting means, a movable cutting bed below the carrier, and a bed-supporting strut adapted to turn and move endwise below the bed, the strut and frame being provided with coöperating members whereby the strut is raised by a partial rotation in one direction and depressed by a partial rotation in the opposite direction, and the bed being supported in a raised operative position by the strut when the latter is raised.

9. A snipping machine comprising a supporting frame, a reciprocating carrier having cutting means, a strut guide in the base of the frame, fixed seats adjacent to said guide having inclined faces and raised supporting faces, a strut adapted to turn and move endwise in said guide and having a handle whereby it may be turned, and projections adapted to coöperate with the said inclined faces in raising the strut when the latter is turned in one direction, a fixed bed guide above the strut guide, and a cutting bed having a shank movable in the bed guide and bearing on said strut, the bed being supported in a raised operative position by the strut when the latter is raised, and depressed when the strut is lowered.

10. A snipping machine comprising a supporting frame, a reciprocating carrier having cutting means, a movable cutting bed having an adjustable telescopic shank and an externally threaded portion, a bed-supporting strut adapted to turn and move endwise below the bed, and bearing on said shank, and coöperating members on the strut and frame whereby the strut is raised and depressed when partly rotated, the bed being supported in a raised operative position by the strut when the latter is raised, and the height of the bed being adjustable by varying the length of the telescopic shank.

11. A snipping machine comprising a supporting frame, a reciprocating carrier having cutting means, a movable cutting bed having an adjustable telescopic shank and an externally threaded portion, a bed-supporting strut adapted to turn and move endwise below the bed, and bearing on said shank, coöperating members on the strut and frame whereby the strut is raised and depressed when partly rotated, the bed being supported in a raised operative position by the strut when the latter is raised, and the height of the bed being adjustable by varying the length of the telescopic shank, one of the members of said shank being provided with a notched circular head, and a detent on the supporting frame adapted to lock said head and shank member against rotation.

12. In a machine of the character described, the combination of a reciprocating cutter and a cutting bed comprising a base, a face plate bearing movably on the base, a clamping frame surrounding a portion of the surface of the face plate, and means for securing the clamping frame to the base in different positions.

13. In a machine of the character described, the combination of a reciprocating cutter and a cutting bed comprising a base, a face plate bearing movably on the base, a clamping frame surrounding a portion of the surface of the face plate, and means for securing the clamping frame to the base in different positions, the face plate being also adjustable independently of the clamping frame.

14. In a machine of the character described, the combination of a reciprocating cutter and a cutting bed comprising a base having parallel slots, a clamping frame having threaded studs projecting through said slots and provided with clamping nuts adapted to bear on the under side of the base, two of the frame members being outwardly offset, and a face plate inserted between the base and the said offset members and clamped against the base thereby, the plate being adjustable in one direction with the clamping frame, and in another direction independently thereof.

15. A snipping machine cutter-head having a shank adapted to detachably engage a carrier, and provided with a central socket and with a series of diverging knives, and a gage provided with a shank slidingly fitted in said socket, the gage being normally depressed yieldingly below the knives.

16. A snipping machine cutter-head having a shank adapted to detachably engage a carrier and provided with a central socket and with a series of diverging knives, a gage provided with a shank slidingly fitted in said socket, the gage being normally depressed yieldingly below the knives, and stop members on the socket and shank to prevent the withdrawal of the shank from the socket.

In testimony whereof I have affixed my signature, in presence of two witnesses.

THOMAS F. HART.

Witnesses:
C. F. BROWN,
P. W. PEZZETTI.

Copies of this patent may be obtained for five cents each, by addressing the "Commissioner of Patents, Washington, D. C."